United States Patent Office 2,817,577
Patented Dec. 24, 1957

2,817,577

HYDRATED MOLYBDENUM(III) PHOSPHATE AND ITS PREPARATION

Joseph H. Balthis, Jr., Mendenhall, Pa., assignor to E. I. du Pont de Nemours and Company, Wilmington, Del., a corporation of Delaware No Drawing. Application March 10, 1954,
Serial No. 415,431

2 Claims. (Cl. 23—105)

This invention relates to a new composition of matter and to methods for obtaining the same. More particularly this invention relates to a new hydrated oxygenated phosphorus compound of trivalent molybdenum, to its preparation and to its use as a hydrogenation catalyst.

Oxygenated phosphorus compounds of trivalent molybdenum are known and various methods for obtaining them are described in the literature. In one typical preparation procedure, molybdenyl oxychloride is reacted with disodium phosphate [J. Chem. Soc., 1090 (1927)]. Another method involves reacting molybdic acid at red heat with metaphosphoric acid and hydrogen, and a third, combination of molybdenum dioxide with molten metaphosphoric acid [Compt. rend. 158, 499 (1914); ibid. 165, 185 (1917); and Bull. Soc. chim. 45, 621 (1929)]. In the compounds obtained by these methods the ratio of molybdenum to phosphorus is either 3:1 or 1:3.

It is an object of this invention to provide a new composition of matter and methods for its preparation. A further object is to provide a new catalytic composition of matter. A still further object is to provide a new hydrated oxygenated phosphorus compound of trivalent molybdenum. Another object is to provide novel catalytic hydrogenation processes, especially for converting carbon monoxide to solid polymethylenes. Other objects will appear hereinafter.

These and other objects of this invention are accomplished by providing a new hydrated oxygenated phosphorus compound of trivalent molybdenum consisting essentially of $MoPO_4 \cdot 3H_2O$. This invention also provides methods for preparing the new compound and processes for using this new compound as a hydrogenation catalyst, particularly in the hydrogenation of carbon monoxide to solid polymethylenes.

It has now been discovered that a new hydrated oxygenated phosphorus compound of trivalent molybdenum consisting essentially of $MoPO_4 \cdot 3H_2O$ is obtained by reacting a water-soluble salt of orthophosphoric acid with a water-soluble polyhalogen compound of trivalent molybdenum in amount providing approximately one phosphate group per molybdenum atom.

A convenient and practical way for preparing the new compound of this invention is by bringing together aqueous solutions containing equimolar amounts of trisodium phosphate and diammonium pentachloroaquomolybdate(III), separating the precipitate which forms, washing it, and drying it at ordinary or elevated temperatures.

The reaction leading to the formation of the molybdenum(III) phosphate is believed to be that schematically represented below:

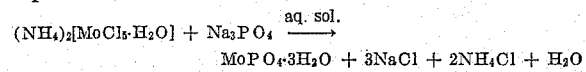

The examples which follow are submitted to illustrate this invention.

*Example I*

A solution of 0.209 mole of trisodium phosphate 12-hydrate in 450 cc. of water is added dropwise with mechanical stirring, under a blanket of nitrogen, to a solution of 0.209 mole of diammonium pentachloroaquomolybdate(III), $[(NH_4)_2MoCl_5 \cdot H_2O]$, in 387 cc. of water. After three hours, the chocolate-colored material that precipitated is separated by filtration, washed eight times with 100 cc. portions of deaerated water, and dried by prolonged evacuation at room temperature. The product weighs 47 g. and corresponds approximately in analysis to molybdenum(III) phosphate, $MoPO_4 \cdot 3H_2O$.

|  | Calc'd | Found |
|---|---|---|
| Percent Mo | 39.16 | 39.08, 39.14 |
| Percent P | 12.65 | 11.97, 11.83 |
| Percent Cl | 0.00 | 0.76, 0.71 |
| Percent NH₃ | 0.00 | 2.20, 2.25 |

The average valence of molybdenum in the compound is found to be 3.3 by titrating a weighed sample of known total molybdenum content with potassium permanganate in acidified ferric alum. The presence of impurities (sodium, chlorine, and ammonia) is attributed to the well known tendency of molybdenum compounds to adsorb impurities during precipitation. Persistence of small quantities of phosphate ion in the washings suggests that molybdenum(III) phosphate is slowly hydrolyzed by water.

The molybdenum(III) phosphate is a brown powder that undergoes little immediate change in appearance on exposure to air. It is oxidized by dilute nitric acid with formation of a yellow solution from which ammonium nitrate precipitates ammonium phosphomolybdate.

A typical lot of molybdenum(III) phosphate underwent no further reduction on heating for 24 hours at 400° C. in dry hydrogen:

|  | Before Heating | After Heating |
|---|---|---|
| Average valence of molybdenum | 3.32 | 3.44 |
| Percent Mo | 39.43 | 47.32 |
| Percent P | 12.35 | 14.83 |
| Percent NH₃ | 1.57 | 0.37 |
| Atomic ratio of Mo/P | 1.03 | 1.03 |

It will be noted that the atomic ratio of molybdenum to phosphorus is not changed. The increase in molybdenum and phosphorus content is attributed to partial elimination of volatile impurities and water. Both the original and the heated phosphates give broad, diffuse X-ray diffraction patterns, indicating that they are largely amorphous.

*Example II*

Typical variations in conditions for preparing the molybdenum(III) phosphate of this invention follow. (Anal.: Calc'd for $MoPO_4 \cdot 3H_2O$: Mo, 39.16%; P, 12.65%.)

(A) A solution of $(NH_4)_2[MoCl_5 \cdot H_2O]$ (0.023 mole) in water (20 cc.) is added to an equimolar quantity of $Na_3PO_4 \cdot 12H_2O$ dissolved in 40 cc. of water. The resulting precipitate is filtered off, well washed with water, and dried at room temperature. Product weighs 5.0 g. and analysis showed that it contained 40.19% Mo and 11.38% P. The average valence of Mo: 3.42. The average valence of molybdenum is obtained by titration with potassium permanganate in acidified ferric alum.

(B) One hundred twenty nine grams of $Na_3PO_4 \cdot 12H_2O$ (0.34 mole) dissolved in 387 cc. of water is added gradually (3 hours) to a freshly prepared solution of $(NH_4)_2[MoCl_5 \cdot H_2O]$ (111.1 g., 0.34 mole) in 333 cc. of water. The precipitate is filtered off, washed 12 times with 165 cc. portions of water, and dried by evacuation at room temperature.

The pH of the filtrate is 2.37. The yield is 77.2 g. Composition of the phosphate: percent Mo: 39.43; percent P: 12.35; impurities: 1.57% $NH_3$, 0.81% Na, 0.99% Cl. The average valence of Mo: 3.32.

(C) Seventy seven and eighty-one hundredths grams of $Na_3PO_4 \cdot 12H_2O$ (0.205 mole) dissolved in 441 cc. of water is added gradually (40 min.) to a freshly prepared solution of $(NH_4)_2[MoCl_5 \cdot H_2O]$ (67.0 g., 0.205 mole) in 436 cc. of water. The precipitate is filtered off, washed 7 times with 218 cc. portions of water, and dried by evacuation at room temperature. The pH of the filtrate is 2.26. The yield is 45.4 g. Composition of the phosphate: percent Mo: 40.84; impurity: 0.84% Cl. The average valence of Mo: 3.29.

(D) Exactly as in (C), except that the slurry is heated for 5 hours at 90° C. prior to filtration. The pH of the filtrate is 1.93. The yield is 48.0 g. Composition of the phosphate: percent Mo: 39.93; impurity: 0.94% Cl. The average valence of Mo: 3.34.

(E) Sixty six grams of $(NH_4)_2[MoCl_5 \cdot H_2O]$ (0.20 mole) in 436 cc. of water is added gradually (41 min.) to a solution of $Na_3PO_4 \cdot 12H_2O$ (75.6 g., 0.20 mole) in 436 cc. of water. Precipitate is filtered off, washed 7 times with 218 cc. portions of water, and dried by evacuation at room temperature. The pH of the filtrate is 1.59. The yield is 43.0 g. Composition of the phosphate: percent Mo: 41.34; impurity: 0.32% Cl. The average valence of Mo: 3.39.

(F) One hundred twenty two grams of $Na_3PO_4 \cdot 12H_2O$ (0.32 mole) dissolved in water (2 liters) is added gradually (4 hours) to a freshly prepared solution of $(NH_4)_2[MoCl_5 \cdot H_2O]$ (105 g., 0.32 mole) in water (2 liters). The slurry is stirred 2 hours on a steam bath, the precipitate is separated, washed twice with four one-liter portions of water, and dried by evacuation at room temperature. The pH of the filtrate is 2.35. The yield is 73.2 g. Composition of the phosphate: percent Mo: 40.69; impurities: 0.67% Na, 1.05% $NH_3$. The average valence of Mo: 3.32.

(G) Twenty one and ninety-five hundredths grams of $Na_3PO_4 \cdot 12H_2O$ (0.0577 mole) dissolved in water (400 cc.) is added gradually (4 hours) to a slurry of charcoal [1] (111.2 g.) in 400 cc. of water to which 13.8 g. of $(NH_4)_2[MoCl_5 \cdot H_2O]$ (0.0577 mole) has been added. The solid is separated, washed 3 times with 800 cc. portions of water, and dried by evacuation at room temperature. The pH of the original filtrate is 2.35.

The diammonium pentachloroaquomolybdate(III), $(NH_4)_2[MoCl_5 \cdot H_2O]$, used in the above examples was prepared by electrolytic reduction. The procedure differed somewhat from that described by Foerster and Fricke, Z. Angew. Chem., 36, 458 (1923), and others. A diaphragm-type reduction cell was employed that comprised an outer cylindrical member of glass 5⅝ inches in diameter by 3¾ inches deep, and an inner, porous, ceramic member 3 inches in diameter by 5 inches in height. The inner vessel, used to contain the anolyte, was open to the air and fitted snugly in the center of an air-tight neoprene cover for the outer member. The outer member contained the catholyte. Openings were provided in the cover to permit blanketing of the catholyte with deoxidized nitrogen, mechanical stirring of the catholyte, and admittance of an electrical lead. The anode was a graphite rod of ⅜ inch diameter, and the cathode was a 3 x 3 inch sheet of bright platinum.

The catholyte was prepared by dissolving 141.3 g. of ammonium paramolybdate 4-hydrate in 667 cc. of concentrated hydrochloric acid and thereafter adjusting with water to a total volume of 800 cc. Concentrated hydrochloric acid was used as the anolyte and was replaced as necessary during electrolysis. A current of 5 amperes was passed for 17 hours at 3.6–4.4 volts. Chlorine was evolved at the anode, and the catholyte underwent a series of color changes, finally becoming red-brown in color. Some $(NH_4)_2[MoCl_5 \cdot H_2O]$ crystallized during the electrolysis. A solution of 49 g. of ammonium chloride in 150 cc. of water was added after electrolysis, and the warm slurry was transferred to an air-free crystallization vessel.

Filtration with absence of air of the combined slurries from two such reductions yielded 185 g. of

$(NH_4)_2[MoCl_5 \cdot H_2O]$

When the filtrate was concentrated at 178 mm. pressure in the absence of air, a further 291 g. of

$(NH_4)_2[MoCl_5 \cdot H_2O]$ crystallized. The product was purified by washing with concentrated hydrochloric acid and with alcohol and dried in vacuo.

In the examples, trisodium phosphate has been used, but it is to be understood that in its place there can be used any primary, secondary, or tertiary water-soluble alkali metal phosphate, e. g., tripotassium and trilithium phosphates, disodium, dipotassium, and dilithium phosphates, and monosodium, monopotassium, and monocaesium phosphates. Primary and secondary ammonium orthophosphates and primary orthophosphates of the alkaline earth metal salts may also be used. When primary and secondary phosphates are used, it is usually desirable to add dilute alkali to reduce acidity and increase the extent of precipitation.

Diammonium pentachloroaquomolybdate(III) has been used in the examples but this is only because of convenience. In its place there can be used any water-soluble polyhalogen compound of trivalent molybdenum, e. g., $MoCl_3$, $MoCl_3 \cdot 3H_2O$, $(NH_4)_3MoCl_6$, $MoBr_3$, $MoI_3$, $(NH_4)_3MoBr_6$, etc.

The reaction between salts of orthophosphoric acid and water-soluble polyhalogen compounds of trivalent molybdenum occurs satisfactorily at room temperature, and this is the temperature generally used for preparing the compounds of this invention.

The molybdenum(III) phosphate of this invention is formed from a mole each of phosphate ion and water-soluble polyhalide of trivalent molybdenum. In practice aqueous solutions containing equal molar quantities of these reactants are mixed with stirring. Molybdenum(III) phosphate is insoluble in water and precipitates as it is formed.

The trivalent molybdenum phosphate of this invention consists essentially of $MoPO_4 \cdot 3H_2O$.

The molybdenum(III) phosphate of this invention is active in promoting the hydrogenation of carbon-carbon, carbon-oxygen, carbon-sulfur, carbon-nitrogen, sulfur-oxygen, etc., unsaturation, and for cleaving sulfur-sulfur, carbon-oxygen, etc., bonds at temperatures ranging from 25° to 500° C. and pressures up to the maximum permitted by the mechanical limitations of the equipment used. As a rule satisfactory hydrogenation rates are realized with the temperature range of 70° to 450° C. and pressures of 50 to 1500 atmospheres, and these embrace the conditions generally employed.

The example which follows illustrates the usefulness of the molybdenum(III) phosphate as a catalyst in the hydrogenation of cyclohexanone in the presence of sulfur to cyclohexyl mercaptan.

A pressure reactor is charged with 98 g. (1 mole) of cyclohexanone, 32 g. of sulfur (1 mole), and 5 g. of molybdenum(III) phosphate, prepared as in Example I, and the reactor swept with oxygen-free nitrogen. The charged reactor is placed on an agitating rack and the charge heated at a gradually increasing temperature from 31° to 308° C. under a hydrogen pressure of 225 to 300 atmospheres until there is no further pressure drop. There-

---

[1] Activated coconut charcoal is freed of impurities by extraction with dilute nitric acid, dried, heated in nitrogen, micro-pulverized to pass a 60-mesh screen, heated in hydrogen at 400° C. to expel air and stored under nitrogen until used.

after, the reactor is allowed to cool to room temperature, opened, and the contents discharged and filtered. Fractional distillation of the filtrate yields 49.7 cc. (43 g.) of a fraction boiling at 155° to 160° C. and 16 cc. (18 g.) of a dark somewhat viscous residue. The 155° to 160° C. material has an $n_D^{25}$ of 1.4935 and is characterized as cyclohexyl mercaptan. The yield of this mercaptan is 41%.

The molybdenum(III) phosphate is also useful in the hydrogenation of carbon monoxide to high molecular weight polymethylenes. In this reaction the best results are obtained in the temperature range of 150° to 325° C. and pressures of 200 to 1500 atmospheres. The example which follows illustrates this specific embodiment:

A mixture of 100 cc. of xylene and 19.3 g. of the molybdenum(III) phosphate of Example I is heated at 270° C. under 900–1000 atmospheres of a $2H_2/1CO$ mixed gas pressure. After 15 hours the gas absorption amounts to 180 atmospheres. Extraction of the crude solid product with benzene and precipitation of the extract with excess methanol yields 0.47 g. of low molecular weight solid hydrocarbon polymer. Subsequent extraction with hot xylene, followed by precipitation of the extract with methanol, gives 1.17 g. of a high molecular weight polymethylene.

As many apparently widely different embodiments of this invention may be made without departing from the spirit and scope thereof, it is to be understood that this invention is not limited to the specific embodiments thereof except as defined in the appended claims.

I claim:

1. Process for preparing a hydrated molybdenum(III) phosphate which comprises mixing and reacting in aqueous solution trisodium phosphate with diammonium pentachloroaquomolybdate(III) in essentially equimolar amounts, and separating therefrom as the resulting product a hydrated molybdenum(III) phosphate consisting essentially of $MoPO_4 \cdot 3H_2O$.

2. Hydrated molybdenum(III) phosphate consisting essentially of $MoPO_4 \cdot 3H_2O$ characterized by being catalytically active for the hydrogenation of carbon monoxide to high molecular weight polymethylenes.

References Cited in the file of this patent

UNITED STATES PATENTS

| Number | Name | Date |
|---|---|---|
| 2,137,407 | Lazier | Nov. 22, 1938 |
| 2,329,934 | Nord | Sept. 21, 1943 |
| 2,352,328 | Kleine | June 27, 1944 |
| 2,414,974 | Nielsen | Jan. 28, 1947 |
| 2,542,813 | Heath | Feb. 20, 1951 |
| 2,652,372 | Farlow et al. | Sept. 15, 1953 |

OTHER REFERENCES

Gmelin-Kraut's Handbuch der Anorganischen Chemie, 3.1, 1912, page 954.

Lexicon-Hoffman, Band 2, AL–X, 1912–1914, No. 56–81, page 708.

Encyclopedia of Chemical Reactions, Jacobson, vol. IV, 1951, page 660 (IV–2720).